(12) United States Patent
Caplan et al.

(10) Patent No.: US 6,257,022 B1
(45) Date of Patent: Jul. 10, 2001

(54) GLASS SLUMPING PROCESS

(75) Inventors: Jessica Caplan; Richard Scott Baker, both of Santa Fe, NM (US)

(73) Assignee: Jezebel, Inc., Santa Fe, NM (US)

( * ) Notice: Subject to any disclaimer, the term of this patent is extended or adjusted under 35 U.S.C. 154(b) by 0 days.

(21) Appl. No.: 09/270,522

(22) Filed: Mar. 17, 1999

(51) Int. Cl.⁷ .................................................. C03B 23/023
(52) U.S. Cl. .................. 65/107; 65/24; 65/112; 65/287; 29/525.01
(58) Field of Search ................................ 65/107, 287, 24, 65/112; 29/525.01

(56) References Cited

U.S. PATENT DOCUMENTS

| | | |
|---|---|---|
| 497,574 | 5/1893 | Heckert . |
| 544,248 | 8/1895 | Cutler . |
| 643,223 | 1/1900 | Houze . |
| 787,438 | 4/1905 | Cutler . |
| 1,161,998 | 11/1915 | Titus et al. . |
| 2,057,763 * | 10/1936 | Boyles ................................. 65/107 |
| 2,218,654 | 10/1940 | Paddock . |
| 2,503,653 | 4/1950 | Boyles et al. . |
| 3,510,284 | 5/1970 | McMaster et al. . |
| 3,560,183 | 2/1971 | Stilley et al. . |
| 4,119,424 | 10/1978 | Comperatore . |
| 4,229,201 | 10/1980 | Comperatore et al. . |
| 4,349,374 | 9/1982 | Rupp . |
| 5,573,566 | 11/1996 | Anderberg et al. . |

FOREIGN PATENT DOCUMENTS

| | | | |
|---|---|---|---|
| 520076 * | 6/1921 | (FR) | ........................................ 65/107 |
| 51-20041 * | 6/1976 | (JP) | ........................................ 65/107 |

OTHER PUBLICATIONS

"Ceramic Slumping Molds", The Bullseye Connection, 1308 NW Everett, Portland OR, Mar. 1, 1997, 4 pages.
Copy of page 160 of FUSING catalog, Sun–Sculpture Mold Sets; Vitreous Clay Molds; Stainless Steel Molds.
Directions on using "Floral Former" mold, 1 page.
Directions for using "Formula B Multifire Mold Material", 1 page.

* cited by examiner

*Primary Examiner*—James Derrington (57) ABSTRACT

A glass slumping process includes the steps of supporting a thin sheet of glass upon a convex mold at a single, minimum area of contact of the glass sheet with the mold, the single area of contact being disposed inwardly of a perimeter of the glass sheet, heating the glass sheet to soften the glass sheet, slumping the glass sheet downwardly over a convex outer surface of the mold in response to the heating, while the glass sheet remains supported by the mold at the single area of contact, cooling the glass sheet and removing the glass sheet from the mold for use as a lamp shade.

20 Claims, 3 Drawing Sheets

GLASS SLUMPING PROCESS

BACKGROUND OF THE INVENTION

1. Field of the invention

The present invention relates to glass slumping processes for shaping glass sheets and, more particularly, to a glass slumping process for shaping a single sheet of glass into a shape for use as a lamp shade.

2. Description of the Related Art

Various processes have been proposed for shaping glass sheets to impart a bend or curvature thereto. Most glass shaping processes are of the "dropout" type. In dropout processes, a sheet of glass is secured or supported along its perimetrical edge over a concave cavity of a mold. The glass is heated so that it softens, causing it to drop or sag into the cavity due to its own weight. The glass sheet thusly assumes a concave shape conforming to the concave cavity of the mold. Illustrative dropout processes for shaping glass sheets are disclosed in U.S. Pat. No. 497,574 to Heckert, U.S. Pat. No. 544,248 to Cutler, U.S. Pat. No. 643,223 to Dhe et al, U.S. Pat. No. 787,438 to Cutler, U.S. Pat. No. 1,161,998 to Titus et al, U.S. Pat. No. 3,510,284 to McMaster et al, U.S. Pat. No. 3,560,183 to Stilley et al, U.S. Pat. No. 4,119,424 to Comperatore, U.S. Pat. No. 4,229,201 to Comperatore et al and U.S. Pat. No. 5,573,566 to Anderberg et al.

A modification of a dropout process wherein a glass sheet drops into a concave cavity of a mold having a plurality of ribs extending radially above a concave surface of the cavity is shown in U.S. Pat. No. 2,503,653 to Boyles et al. In the Boyles et al process, the glass sags a greater amount between the ribs to assume a scalloped or fluted shape for use as a lamp shade.

Vacuum forming processes have also been used to shape glass sheets that have been softened by heating. U.S. Pat. No. 4,349,374 to Rupp is representative of a vacuum forming process. In addition, vacuum forming has been used in combination with dropout processes to promote sagging of the glass sheets into cavities of the molds as exemplified by Cutler '248 and '438, McMaster and Anderberg et al. Numerous disadvantages and drawbacks are associated with dropout processes for shaping glass sheets. The perimetrical edges of the glass sheets secured to the molds are prevented from dropping or sagging into the cavities of the molds. This results in formation of protruding, perimetrical flanges in the glass sheets after shaping, such flanges circumscribing or surrounding portions of the glass sheets that have been allowed to drop or sag into the cavities. Depending on the intended use for the shaped glass sheets, such flanges may be undesirable and require removal. Removal of the flanges adds additional cost, labor and time to the glass shaping processes. Another drawback of dropout processes is that the glass sheets tend to be undesirably stretched when they drop into the molds. Additionally, although dropout processes are effective for relatively thick (e.g. ½–1 inch thick) glass sheets, such processes are generally unsuitable for relatively thin (e.g. ¼ inch thick or less) glass sheets. Most dropout processes involve heating the glass sheets relatively rapidly, which is detrimental to relatively thin glass sheets and/or "art" glass sheets. Many dropout processes also involve multiple heating cycles (firings), movement of the glass sheets during heating, repositioning of the glass sheets in or on the molds and/or transfers of the glass sheets between different molds, thusly adding undesirably to the complexity, cost, time and labor for the glass shaping processes. Furthermore, dropout processes typically involve contacting the glass sheets with chemicals, gases or extraneous mechanical components, which is highly undesirable when shaping art glass sheets.

Vacuum forming processes for shaping glass sheets possess many of the drawbacks and disadvantages associated with dropout processes. In addition, the glass sheets may crack or otherwise be impaired due to inconsistencies or lack of control in the applied vacuum. Moreover, the appearance of the glass may be undesirably altered due to application of the vacuum, which is a significant drawback when aesthetics are important, such as when using art glass.

It has also been proposed to slump heated glass sheets in a convex manner, rather than the concave manner associated with dropout processes. Exemplary "slumping" processes are represented by Rupp and by U.S. Pat. No. 2,218,654 to Paddock. In Rupp, the heated glass sheet does not naturally slump due to gravity but, rather, is forced to slump via an applied vacuum. Accordingly, the process disclosed by Rupp is essentially a vacuum forming process and is associated with the various disadvantages and drawbacks of vacuum forming processes discussed above. In addition, the process disclosed by Rupp involves slumping only a portion of the glass sheet, which must initially be provided with concave and convex surfaces. The process disclosed by Paddock involves supporting a transverse middle section of a glass sheet upon spaced parallel rollers defining parallel lines of transverse support for the glass sheet. After being heated, two opposing ends or sides of the glass sheet slump down while the middle section remains supported on the rollers to form an initial bend, but not a dome shape. The glass sheet is then placed in a concave mold to obtain a final, greater bend by heating the glass sheet to cause it to drop into a concave cavity of the mold. The process of Paddock has many of the same disadvantages and drawbacks discussed above, particularly since the Paddock process is basically a dropout process and requires two heating cycles or firings.

In the area of art glass shaping, conventional glass shaping processes have proved to be inadequate. Art glass, such as that made by Youghiogheny Glass of Youghiogheny, Pennsylvania, possesses unique compositional and behavioral characteristics different than those of conventional plate, crown, kitchen, window or sheet glass to which most of the processes discussed above are directed. Such art glass typically contains visible colorations, striations, stipples, mottles or other patterns, iridescence, opacity, brilliance, luster and/or radiance created by particular crystallization and/or precise glass chemistry and control of heat differentials when the glass is being formed. The "Stipple" line of art glass of Youghiogheny Glass is representative of an art glass that has a unique molecular structure. Due to the unique characteristics and behavior thereof, such art glass is extremely difficult to shape using conventional glass shaping apparatus and processes. For instance, the amount of time used in conventional glass shaping processes to heat glass sheets to a maximum temperature and the rate at which the temperature is increased during such time have been found by the present applicants to be inappropriate for shaping art glass and, in particular, for shaping a single sheet of art glass into a configuration for use as a lamp shade. Other parameters of conventional glass shaping processes, such as the particular maximum temperature, the duration of the maximum temperature, the rate at which the glass is cooled and the temperature at which the shaped glass is removed from the kiln, have also been found by the present applicants to be inapplicable in various respects to shaping art glass. Since art glass is highly sensitive, even small variations in process parameters may produce detrimental results. Furthermore, in order to maintain the purity and appearance of art glass, it is desirable to avoid exposure of the art glass to chemicals, gases or other foreign substances. In addition, it is desirable to greatly minimize contact of the art glass with the mold being used as well as any other extraneous mechanical components or structure.

Accordingly, the need exists for a slumping process for glass sheets, particularly sheets of art glass, wherein the glass sheets, upon being heated, are allowed to fall naturally over a convex mold to obtain a final shape in a single heating cycle or firing. The need further exists for a glass slumping process applicable to relatively thin sheets of art glass. There is also a need for a slumping process wherein natural slumping of glass sheets upon being heated is controlled or guided by protrusions or arms on a convex mold. An unfulfilled need also exists for a glass slumping process having process parameters specifically adapted for art glass, particularly the art glass of Youghiogheny Glass of Youghiogheny, Pa.

SUMMARY OF THE INVENTION

Accordingly, it is a primary object of the present invention to overcome the aforementioned disadvantages of prior glass shaping processes.

Another object of the present invention is to slump a single sheet of glass over a convex mold in response to softening of the sheet of glass by heating.

A further object of the present invention is to slump a single sheet of art glass over a convex mold in response to softening of the sheet of art glass by heating in order to shape the sheet of art glass into a configuration for use as a lamp shade.

An additional object of the present invention is to guide or control natural slumping of a heated sheet of glass over a convex mold.

It is also an object of the present invention to support a glass sheet upon a convex mold at a single area or point of contact between the glass sheet and the mold and to heat the glass sheet to cause it to slump naturally over the mold.

Yet a further object of the present invention is to identify the process parameters needed to slump a single sheet of art glass over a convex mold to form a lamp shade.

Some of the advantages of the present invention are that the glass sheets are not exposed to foreign chemicals, gases or other substances, contact of the glass sheets with the mold and other mechanical structure or components is greatly minimized, the glass sheets are merely supported or balanced on the mold without any extraneous securing structure, purity and aesthetic appearance of the glass sheets are maintained, glass sheets can be shaped by slumping over a convex mold in a single heating cycle or firing, the steps involved in glass shaping are greatly simplified, the number of steps involved in glass shaping are reduced, the time, cost and labor involved in glass shaping are all reduced, a single mold can be used multiple times, the shaped glass is easily removable from the mold, the sheets of glass do not stretch or stretch only a minute amount during the slumping process, the number and location of the protrusions or arms on the mold can vary in accordance with the shapes desired for the glass sheets, the mold may be made of a material or materials serving as a repellent to facilitate removal of the shaped glass sheets therefrom and the mold may be provided without arms or protrusions to obtain a natural, free form effect for the shaped glass sheets.

These and other objects, advantages and benefits are realized with the present invention as generally character- ized in a glass slumping process for shaping glass sheets and, in particular, sheets of art glass made by Youghiogheny Glass of Youghiogheny, Pa. According to the process of the subject invention, a thin, single sheet of glass is supported upon a convex mold at a single, minimum area or point of contact of the glass sheet with the mold. The minimum area or point of contact is disposed inwardly of a perimeter of the glass sheet and, in particular, is defined by contact of the center of the glass sheet with an apex of the convex mold. The convex mold with the glass sheet thusly supported thereon is placed in a kiln and is gradually heated to a maximum temperature. In response to such heating, the glass sheet is softened and begins to slump downwardly over the convex mold. Initially, the glass sheet slumps downwardly over the mold a greater amount in a first direction than in a second direction transverse to the first direction. As heating is continued, the glass sheet slumps a greater amount in the second direction than the first direction until the glass sheet has slumped substantially the same overall or total amount in both the first and second directions. Once slumping has been completed, the kiln is allowed to cool. When sufficiently cooled, the mold and the glass sheet are removed from the kiln, and the glass sheet is removed from the mold. The glass sheet will thusly have assumed a dome or convex shape particularly advantageous for use as a lamp shade. According to a preferred embodiment, the mold used in the process includes a plurality of spaced protrusions or arms protruding from a convex outer surface of the mold. The glass sheet is supported upon the arms as R slumps, and the glass sheet slumps a greater amount between the arms to assume a draped effect. The kiln is heated at a rate no faster than 500° Fahrenheit per hour to achieve a maximum temperature of 1400° Fahrenheit. The kiln is cooled at a rate no faster than 600° Fahrenheit per hour, and the glass sheet is removed from the kiln when it is no hotter than 500° Fahrenheit.

Other objects and advantages of the present invention will become apparent from the following description of the preferred embodiments taken in conjunction with the accompanying drawings, wherein like parts in each of the several figures are identified by the same reference characters.

DESCRIPTION OF THE PREFERRED EMBODIMENTS

The glass slumping process according to the present invention involves slumping a heat-softened glass sheet over a convex mold to shape the glass sheet for use as a lamp shade. A convex mold for use in the glass slumping process of the present invention is illustrated at 10 in FIGS. 1 and 2. The mold 10 includes a body 12 and a plurality of protrusions or arms 14 protruding from the body 12. The body 12 has a convex, dome-shaped or partial spherical portion 16 merging with or blending into a base portion 18. The base portion 18 has a square or substantially square perimeter or external periphery defined by a pair of straight, parallel sides 20 and a pair of straight, parallel sides 21 extending between sides 20. However, the base portion 18 can have various alternative perimetrical or external peripheral configurations including circular, oval and rectangular configurations, for example. The base portion 18 has a planar or flat lower surface 22 by which the mold 10 is firmly supported right side up or in an upright position on a flat or planar support surface, such as a flat, interior support surface of a kiln, oven, furnace or other heating enclosure.

Figure 1:
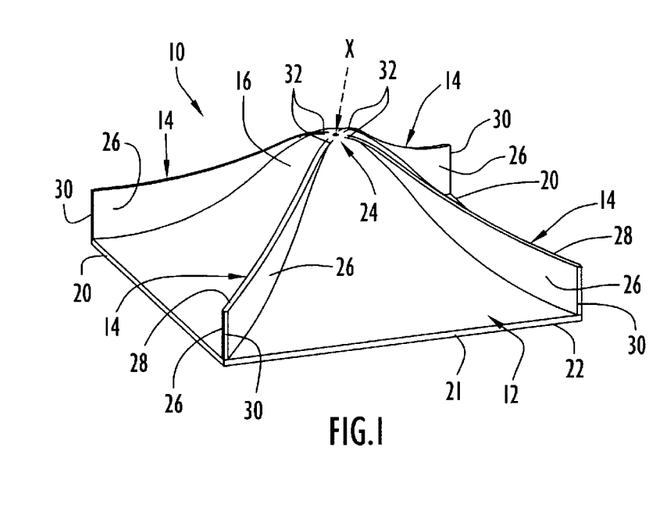
FIG. 1 is a perspective view of a convex mold for use in the glass slumping process according to the present invention.
Figure 2:
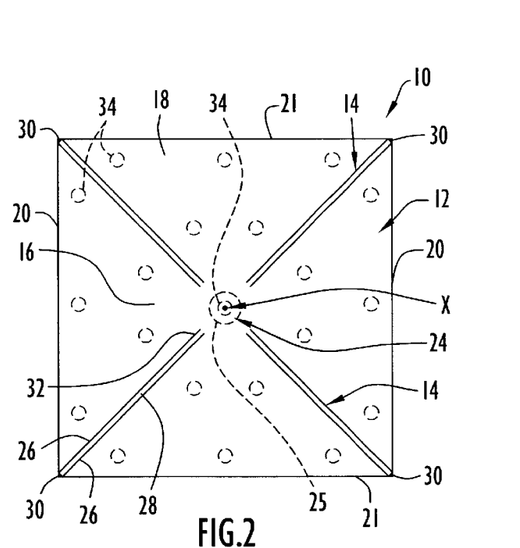
FIG. 2 is a top view of the mold.

The convex portion 16 protrudes upwardly from the base portion 18 and is disposed within or inside of the perimeter or external periphery thereof. The convex portion 16 is symmetrical with the base portion 18. Accordingly, the convex portion 16 has a central axis X coincident or aligned with the center of base portion 18, the central axis X extending perpendicular to the lower surface 22. It should be appreciated that the convex portion does not have to be symmetrical with the base portion and that the axis X does not have to be coincident or aligned with the center of the base portion. However, coincidence or alignment of axis X with the center of the base portion may be desirable for enhanced stability when the mold is supported by the support surface. The convex portion 16 terminates above the base portion 18 in a flat or planar upper surface 24 of minimal surface area. The upper surface 24 is parallel to the lower surface 22 and defines an uppermost surface or apex of mold 10 while the lower surface 22 defines a lowermost surface or base of mold 10. The upper surface 24 has a center coincident or aligned with the central axis X and, therefore, with the center of base portion 18. The planar upper surface 24 is circumscribed, bordered or surrounded entirely by a perimetrical or peripheral edge or border 25 merging with or blending into the non-planar outer or external surface of the convex portion 16. Preferably, the edge or border 25 is rounded, curved or blunt so that no sharp edges or corners are presented which might mar the glass being shaped by mold 10.

Arms 14 are arranged at spaced locations about the central axis X. In the case of mold 10, four arms 14 are disposed at 90° spaced locations about the central axis X. The arms 14 protrude or extend upwardly from the body 12 in a direction perpendicular to lower surface 22 and extend lengthwise in directions radial to the central axis X. Each arm 14 includes a pair of side walls 26 defining a thickness therebetween, a top wall 28 extending between side walls 26 along the length of the arm and an end wall 30 extending between side walls 26 along the height of the arm. The end walls 30 are disposed at respective corners of base portion 18, each corner being defined by the intersection of a side 20 with a side 21. The end walls 30, which define outer ends for the arms 14, respectively, extend upwardly or vertically from the base portion 18. The top walls 28 extend between end walls 30, respectively, and inner ends 32, respectively, of the arms 14. Each arm 14 has a length between its outer end, i.e. its end wall 30, and its inner end 32, and the arms 14 are of the same or substantially the same length. The inner ends 32 merge with or blend into the outer surface of convex portion 16. The inner ends 32 may be disposed outwardly of the edge or border 25 of upper surface 24 or may merge with or blend into the edge or border.

Each arm 14 is of non-uniform or varying height along the length thereof, the height being defined by the distance between top wall 28 and the outer surface of convex portion 16 in a direction perpendicular to lower surface 22 and upper surface 24. Accordingly, the top walls 28 are gently curved or sloping, with the arms 14 having a minimum or no height at inner ends 32 and a maximum height at end walls 30 such that the arm height gradually increases from the inner ends to the outer ends. Each arm 14 may be of uniform thickness or non-uniform or varying thickness. In the case of mold 10, each arm 14 is of uniform thickness. However, the arms can be of increased thickness at the inner ends 32 and where the side walls 26 merge with or blend into the outer surface of convex portion 16. In particular, each arm 14 can be flared at inner ends 32 and along the outer surface of convex portion 16. The side walls 26 may be straight, flat or planar or non-straight, non-flat or non-planar. The side walls 26 for each arm may be parallel to one another or non-parallel. In the case of mold 10, the side walls 26 for each arm 14 are planar and parallel. However, the side walls can be non-parallel or non-planar, such as at the inner ends 32 and where the side walls merge with or blend into the outer surface of convex portion 16. The thickness of arms 14 can vary in accordance with the thickness desired for flutes or folds formed in a glass sheet that is slumped over mold 10 as explained further below. The arms 14 may be formed separately from the body 12 and thereafter secured thereto, or the arms 14 may be formed integrally, unitarily with body 12.

According to a preferred embodiment for convex mold 10, sides 20 and sides 21 have a length of approximately 20 inches, the overall height of the mold corresponding to the perpendicular distance between lower surface 22 and upper surface 24 is approximately 9 inches, the thickness of arms 14 is approximately ½ to 1 inch, the maximum height of arms 14 is approximately 4 inches, and the upper surface 24 is approximately ½ to 1 inch in diameter.

Accordingly to the preferred embodiment, the mold 10 is hollow in that a concave or bowl-shaped cavity is defined in the mold when it is inverted or turned upside down from the upright position. Accordingly, the lower surface 22 is not solid or continuous over the entire area of the base portion 18. Rather, the lower surface 22 is solid or continuous along the perimeter or external periphery of base portion 18 and circumscribes or surrounds an opening into the concave cavity. When the mold 10 is supported right side up or in the upright position upon a support surface, the opening circumscribed by lower surface 22 is closed by the support surface. Preferably, a plurality of holes 34, shown in dotted lines in FIG. 2, are formed in the body 12 to allow gases, including steam, and other chemicals to escape from or burn out of the mold when the mold is initially heated or fired. The holes 34 prevent gases from being trapped in the concave cavity when the mold is initially heated or fired while in the upright position.

Various materials can be used for mold 10. The mold 10 can be fabricated in many various ways to have the desired shape in accordance with the materials of which the mold is made. The mold 10 can be hollow as described above, or the mold 10 can be solid with a continuous lower surface 22 and with no concave cavity therein. A hollow mold has the advantages of reducing the quantity of material needed for the mold and of reducing cost. The arms 14 can be made separately from body 12 and subsequently secured thereto, or the body 12 and the arms 14 can be formed integrally, unitarily as a single member. According to the preferred embodiment, the mold 10 is made from a mold mix that is initially in a dry powder form. The mold mix is preferably composed of 57% silica flour, 34% ½ hydrated plaster of Paris, 5% alumina hydrate and 3% starch. The mold mix is combined with water, typically 0.45 part water for every 1 part of mold mix, to form a mold compound having a moldable or shapeable consistency. The mold compound is pressed into a negative casting of body 12, the negative casting having a concave recess or cavity corresponding to the outer surface of convex portion 16. To form a hollow mold, the mold compound is pressed into the negative casting, which is preferably made of hard plaster, in a layer approximately ½ to 2 inches in thickness and, preferably, ½ to 1 inch thick. The layer of mold compound is flared outwardly from the cavity of the casting to form the base portion 18 of mold 10. The arms 14 are made separately from the body 12 and are manually shaped from the mold compound. The body 12, which is disposed in the casting, and the arms 14, which are separate from the body 12, are allowed to harden, rigidify, stiffen or "set up". This occurs naturally due to a heat producing chemical reaction that occurs in the mold compound in response to the mold mix being combined with water. Once the mold compound has become hard, stiff or rigid, the body 12 is removed from the casting, and the arms 14 are attached thereto using additional mold compound. Typically, the body 12 is removed from the casting after about 1 hour. The top of convex portion 16 is sanded down to form upper surface or apex 24, and the entire mold 10 is sanded smooth. Holes 34 are drilled in the convex portion 16 to extend entirely through the now hardened layer of mold compound, which defines the wall of mold 10. Preferably, about five to ten holes, each ¼ inch in diameter, are drilled in the convex portion 16 at spaced locations between each pair of arms 14, and a single ¼ inch diameter hole is drilled in the portion of the wall forming upper surface 24.

The mold 10 is then fired or heated in a kiln, oven, furnace or other heating enclosure to release gases and chemicals that would otherwise dirty, contaminate or mar the glass being shaped with use of the mold. The mold 10 is positioned in the upright position upon an interior support surface of the kiln and is heated to a maximum temperature at least as great and, preferably, greater than, the maximum temperature to which the glass to be shaped is to be heated. For use in the glass slumping process according to the present invention, the mold 10 is heated to a temperature of 1400° Fahrenheit. As the mold 10 is heated, moisture or steam that is generated due to such heating is allowed to escape from the concave cavity of convex portion 16 via the holes 34, which also serve to enhance heat circulation. In addition, the kiln should be vented during heating of the mold 10 to allow moisture or steam to escape therefrom. In this way, cracking of the mold 10 due to pressure of the steam or moisture is avoided. When heating mold 10, it is important that the temperature not be raised too rapidly in order to avoid excessive moisture or steam from being trapped in the concave cavity of the mold and, therefore, to avoid cracking of the mold. It is preferred that the mold 10 be heated to its maximum temperature at a rate of temperature increase of 200° to 300° Fahrenheit per hour. Once the mold 10 has been heated to its maximum temperature, further heating is discontinued and the mold is allowed to cool. The mold 10 is then removed from the kiln and, upon further cooling, is ready for use in the glass slumping process according to the present invention.

Prior to heating or firing the mold 10 as described above, a kiln wash may be applied to the mold for enhanced durability and increased life of the mold and to promote removal of glass sheets from the mold when the mold is used to shape the glass sheets in accordance with the glass slumping process of the present invention. A preferred kiln wash for mold 10 is comprised of 50% alumina hydrate and 50% kaoline. A kiln wash is considered optional and not required for mold 10 since the preferred mold 10 is able to be utilized multiple times and serves to repel the glass sheets therefrom for easy removal.

Figure 3:
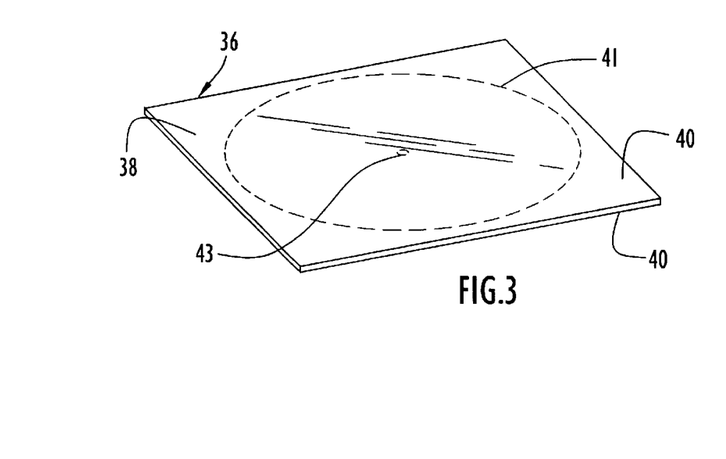
FIG. 3 is a perspective view of a sheet of art glass for use in the glass slumping process.

FIG. 3 illustrates a single sheet 36 of glass 38 for use in the glass slumping process of the present invention. Sheet 36 is flat or planar with parallel upper and lower planar surfaces 40 defining a thickness therebetween which, in the case of sheet 36, is ¼ inch or less. The glass 38 is an art glass containing visible colorations, striations, stipples, mottles or other patterns, iridescence, opacity, brilliance, luster and/or radiance created by particular crystallization and/or precise glass chemistry and control of heat differentials during the glass forming process. According to a preferred embodiment of the invention, the glass 38 is the art glass made by Youghiogheny Glass of Youghiogheny, Pa. In particular, the "Stipple" line of art glass of Youghiogheny Glass is representative of the type of art glass to which the process of the subject invention is particularly adapted.

The sheet 36 is formed integrally, unitarily as a single sheet or piece of glass 38. The sheet 36 is in its original intended form, as made at a glass factory, and is unaltered upon receipt from the factory prior to the glass slumping process. The sheet 36 is not made up of smaller, individual pieces of glass that are soldered together or refused to form a larger sheet, piece or expanse. The sheet 36 is solid and continuous throughout its entire thickness, which is uniform, and is not formed as fused layers of individual thicknesses. The sheet 36 of glass 38 does not contain any toxic lead or lead substitutes, such as those used for soldering together individual pieces of glass, and is not associated with fumes due to soldering or soldering aids, such as fluxes. Since the sheet 36 is a single uninterrupted piece, there are no dark shadowing lines running across the glass sheet as are present where lead or lead substitutes are used to connect smaller pieces of glass together. No permanent attachments of any kind are affixed to the glass. Since the sheet 36 is not pieced together, many hours of labor are saved preparatory to the glass slumping process. Prior to commencement of the actual glass slumping process, the sheet 36 is cut to have a predetermined perimetrical or external peripheral shape or configuration depending on the final shape or configuration desired for the sheet 36 after slumping. As shown in dotted lines in FIG. 3, the sheet 36 is cut to have a circular perimeter or external periphery 41 having a diameter of 14 inches or more to form a lamp shade for use in a table lamp. The circular sheet 36 is then ready to be utilized in the glass slumping process of the present invention. It should be appreciated that the sheet 36 can be cut to various sizes depending on the type of lamp with which the lamp shade is to be used. For example, the sheet 36 can be cut to larger sizes to produce a larger size lamp shade suitable for use with a table lamp or a floor lamp, and can be cut to smaller sizes to produce a smaller size lamp shade suitable for use with a chandelier or a sconce. Preferably, the sheet 36 is cut using a wet band saw for a precise, clean cut without defacement of the glass 38. If desired, a hole 43 can be drilled in the center of the circular sheet 36, as shown in dotted lines in FIG. 3, for accommodation of a lamp harp when the sheet 36, after slumping, is used as a lamp shade.

Figure 4:
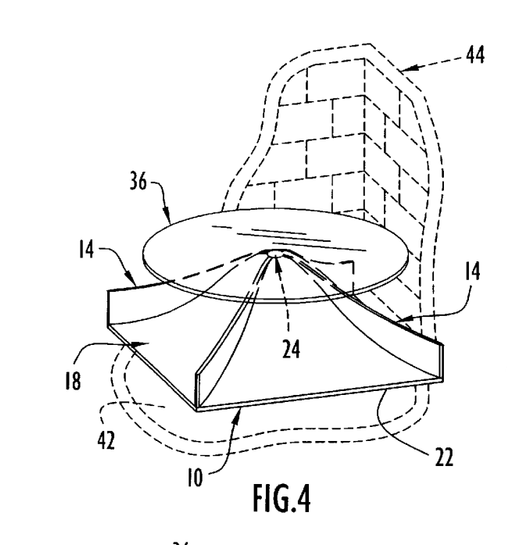
FIG. 4 is a perspective view of the mold, with the glass sheet supported thereon, positioned within a kiln.

In accordance with the glass slumping process, the mold 10 is placed in the upright position upon a flat or planar interior support surface 42 within a kiln, oven, furnace or other heating enclosure 44 as shown in FIG. 4. The lower surface 22 of mold 10 will be in engagement with the interior support surface 42 such that the mold 10 is firmly supported by its base portion 18 upon the interior support surface 42 without wobbling, tilting or tipping. The sheet 36 is positioned on the upper surface 24 of mold 10 with the center of sheet 36 aligned with the center of upper surface 24. As shown in FIG. 4, the sheet 36 is merely balanced or supported on the upper surface 24 without any extraneous securing devices or structure. Contact of the sheet 36 with the mold 10 occurs only at the upper surface 24, which defines a single, minimum area or point of contact for the sheet 36 with the mold 10. Except for the single area or point of contact, which is preferably ½ to 1 inch in diameter, the sheet 36 does not touch the mold 10. The single, minimum area or point of contact is disposed inwardly or inside of the perimetrical or external peripheral edge of sheet 36, the minimum area of contact being disposed at the center of sheet 36. The minimum area or point of contact is substantially smaller than the total surface area of sheet 36. For the preferred embodiment, the minimum area of contact is a circular area ½ to 1 inch in diameter for a glass sheet at least 14 inches in diameter.

Once the sheet 36 of glass 38 has been placed upon the mold 10 as shown in FIG. 4, the kiln 44 is closed and is heated or fired in order to heat the glass sheet to a maximum temperature. The kiln 44 is heated gradually so that the sheet 36 is heated at a rate of temperature increase no greater than 500° Fahrenheit per hour and, preferably, at a rate of 100° to 110° Fahrenheit per hour. The kiln 44 is heated at the rate of temperature increase until the maximum temperature has been reached. The maximum temperature is no greater than 1400° Fahrenheit and, preferably, is in the range of 1125° to 1175° Fahrenheit. Once the sheet 36 has been heated to the maximum temperature, the maximum temperature is preferably maintained for 30 to 60 minutes. The holes 34 in the mold 10 facilitate heat circulation and uniform heat distribution. In response to being heated, the sheet 36 softens and slumps downwardly over the mold 10 as explained in greater detail below.

Figure 5:
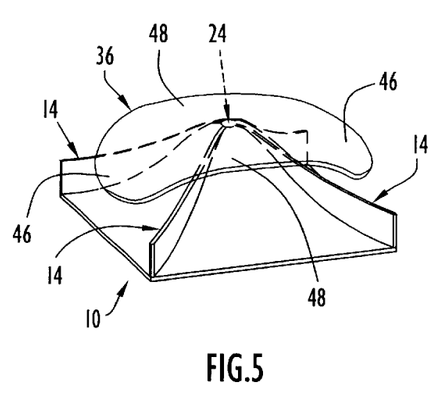
FIG. 5 is a perspective view illustrating initial slumping of the glass sheet over the mold in response to heating, the glass sheet slumping a greater amount in a first direction than a second direction transverse to the first direction.
Figure 6:
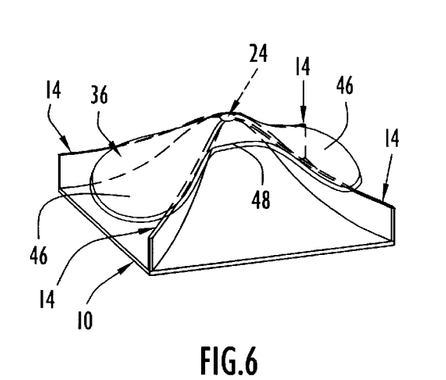
FIG. 6 is a perspective view illustrating further slumping of the glass sheet over the mold, the glass sheet continuing to slump a greater amount in the first direction than the second direction.

FIGS. 5–9, in which the kiln 44 is not shown, illustrate the various stages of slumping ii of sheet 36 when heated as described above. As the kiln 44 is heated, the glass 38 begins to soften, causing the sheet 36 to slump, bend or fold downwardly and inwardly over the mold 10 due to its own weight, while remaining supported on the mold 10 at the minimum area or point of contact 24. Initially, however, the sheet 36 does not slump, bend or fold downwardly and inwardly in a uniform manner. Rather, opposing ends or sides of sheet 36 slump, bend or fold downwardly and inwardly considerably more than the transverse opposing ends or sides of sheet 36 in the manner of a "taco". Accordingly, maximum slumping initially occurs in a first direction while minimum or no slumping initially occurs in a second direction, which is transverse to the first direction. As seen in FIG. 5, opposing ends or sides 46 of sheet 36 initially undergo maximum slumping while opposing ends or sides 48, transverse to sides 46, initially undergo minimum or no slumping. As heating continues, "tacoing" of the sheet 36 also continues. As shown in FIG. 6, the opposing ends or sides 46 continue to slump, bend or fold downwardly and inwardly over mold 10 while the opposing ends or sides 48 do not slump or slump only a minimal amount. Accordingly, the sheet 36 initially slumps over the mold 10 a greater amount in the first direction than in the second direction. The ends or sides 46 continue to slump, bend or fold downwardly and inwardly over the mold 10 until the sheet 36 contacts the arms 14 and is supported thereon as shown in FIG. 6. Since the arms 14 are of minimal thickness, contact of the sheet 36 with the mold 10 is minimized. In addition, the arms 14 are smooth and do not injure or mar the glass.

Figure 7:
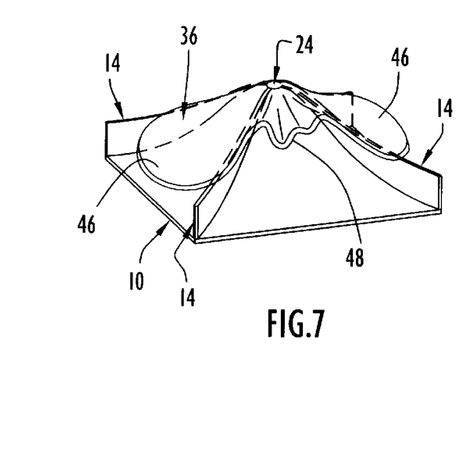
FIG. 7 is a perspective view illustrating still further slumping of the glass sheet over the mold, the glass sheet beginning to slump a greater amount in the second direction than the first direction.
Figure 8:
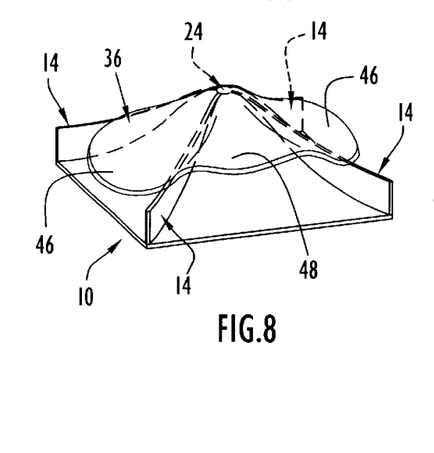
FIG. 8 is a perspective view illustrating even further slumping of the glass sheet over the mold, the glass sheet continuing to slump a greater amount in the second direction than the first direction.

Once the sheet 36 rests upon the arms 14, continued heating results in the opposing ends or sides 48 slumping, bending or folding downwardly and inwardly over the mold 10 an amount greater than sides 46. As shown in FIG. 7, wherein only one of the opposing ends or sides 48 is visible, the ends or sides 48 slump downwardly and inwardly over the mold 10 irregularly or non-uniformly and undergo maximum slumping while the ends or sides 46 do not slump or undergo only minimal additional slumping. With continued heating, the ends or sides 48 continue to slump more than sides 46 as shown in FIG. 8; and, accordingly, the sheet 36 slumps a greater amount in the second direction than in the first direction.

Figure 9:
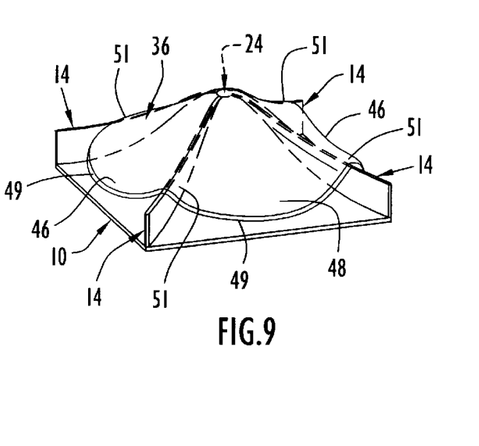
FIG. 9 is a perspective view illustrating final slumping of the glass sheet over the mold, the glass sheet having slumped substantially the same overall amount in the first and second directions.

FIG. 9 illustrates the sheet 36 upon final slumping, at which stage the sides 46 and 48 each have slumped a similar or substantially the same overall amount between the arms 14. Upon final slumping, the sheet 36 has a very attractive, natural draped shape with the sheet 36 having slumped downwardly and inwardly a greater amount between arms 14. The sheet 36 defines smooth, arcuate or curved lower edge segments 49 between arms 14, the edge segments 49 having a maximum curvature centrally between arms 14. The sheet 36 is closer to the convex portion 16 between the arms 14 than at the arms 14, and the sheet 36 may slump into contact with the convex portion 16 between the arms 14. Where the sheet 36 is supported by arms 14, flutes or folds 51 are formed in the sheet 36.

Figure 10:
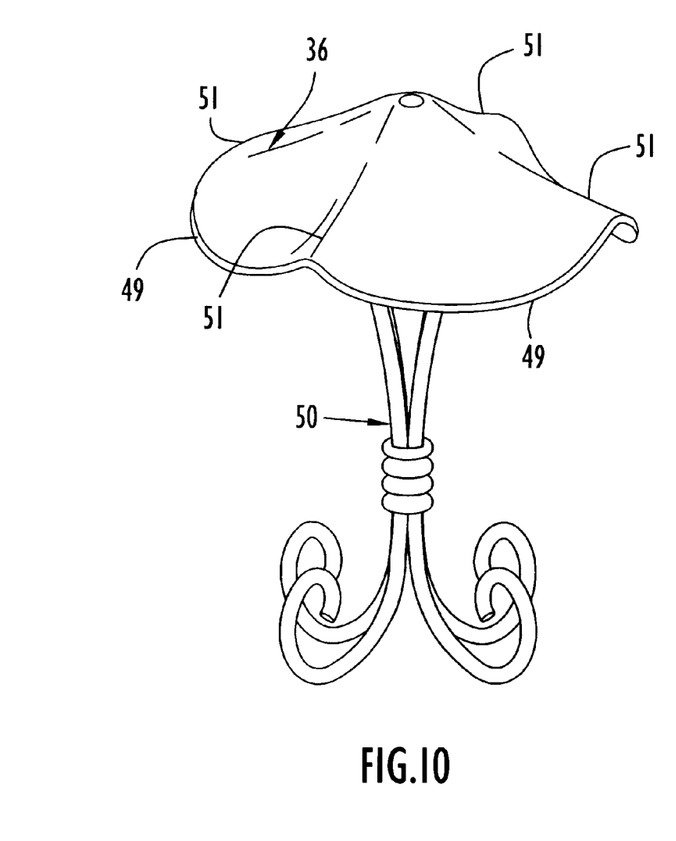
FIG. 10 illustrates the shaped glass sheet removed from the mold following cooling and used as a lamp shade.

Once the sheet 36 has achieved final slumping, the kiln 44 is allowed to slowly cool in order to cool the sheet 36. Preferably, the sheet 36 is cooled at a rate of temperature decrease no faster than 600° Fahrenheit per hour and, preferably, at a rate of 100° to 200° Fahrenheit per hour. When the sheet 36 is no hotter than 500° Fahrenheit, it and the mold 10 are removed from the kiln 44. Upon cooling sufficiently, the thusly shaped glass sheet 36 is removed from the mold 10. The material of mold 10, when constructed in accordance with the preferred embodiment, acts as a repellant to the glass 38 thusly allowing the sheet 36 to be easily lifted off of the mold without sticking and, therefore, without damage to the sheet 36. Upon removal from mold 10, the sheet 36 is ready to be used as a lamp shade as shown in FIG. 10, which illustrates the shaped glass sheet 36 assembled to a lamp base 50.

Figure 11:
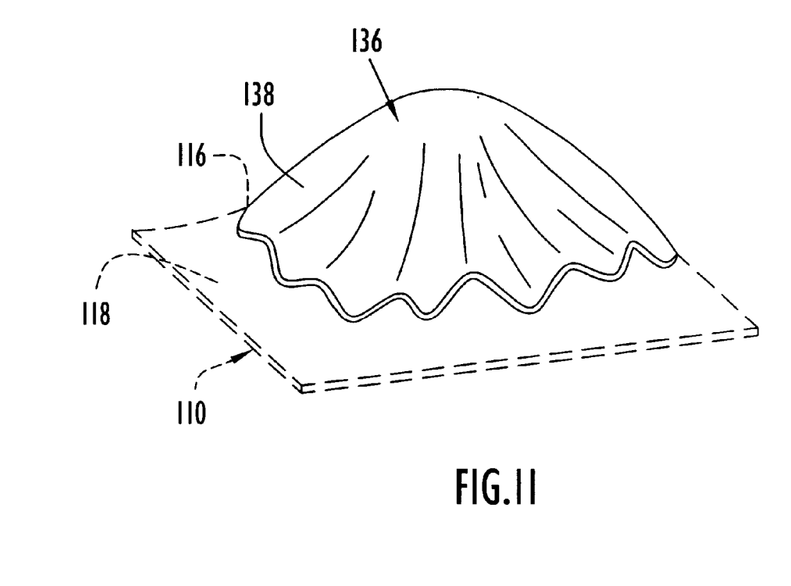
FIG. 11 illustrates final slumping of a glass sheet over an alternative convex mold in the glass slumping process according to the present invention.

A modification of a glass slumping process according to the present invention is illustrated in FIG. 11 which shows a sheet 136 of glass 138 after having undergone final slumping over a convex mold 110. The convex mold 110 is similar to the convex mold 10 except that convex mold 110 does not include any protrusions or arms. Accordingly, the mold 110 includes only a convex portion 116 protruding upwardly from the base portion 118. The glass slumping process utilizing mold 110 is similar to that described above except that the sheet 136 slumps over the mold 110 in free form fashion to form a ruffled or flower effect.

It should be appreciated, therefore, that various configurations of convex molds can be utilized in the glass slumping process of the present invention in accordance with the final shape desired for the glass sheet. As an example, the molds can have convex, dome-shaped or partial spherical portions or pumpkin-shaped portions with or without arms protruding therefrom. However, where arms are utilized in the molds, slumping of the glass sheet is guided or controlled thereby. Where eight arms are provided in a convex mold at 45° spaced locations about the central axis, for instance, the glass sheet will assume a fluted shell-like shape upon final slumping.

With the glass slumping process of the present invention, an individual glass sheet of minimal thickness is shaped over a convex mold in a single heating cycle (firing) for use as a lamp shade. The subject invention is particularly applicable to art glass and, in particular, the art glass made by Youghiogheny Glass. By virtue of the subject invention, the glass sheet does not stretch or thin out during slumping but, rather, is merely reshaped. Contact of the glass sheet with the mold is minimized. During most of the glass slumping process, the glass sheet contacts the mold only at the minimum area or point of contact and, after slumping is nearly complete, additionally contacts the mold 10 at the arms 14. The glass sheet is not exposed to any added chemicals, gases or other foreign substances during the glass slumping process. The glass slumping process improves the overall strength or plasticity of art glass, making it more resilient to bumps and dings that would otherwise cause cracks. The molds are reusable and allow for multiple heating cycles or firings. The entire glass slumping process is completed in a single heating cycle (firing) without the need for moving or repositioning the glass sheet and without the need for transferring the glass sheet between multiple different molds.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A glass slumping process for shaping a glass sheet comprising the steps of
    supporting a circular glass sheet of uniform thickness upon a convex, partial spherical outer surface of a mold at a single, minimum area of contact of the glass sheet with the mold, the single area of contact being aligned with the center of the glass sheet;
    heating the glass sheet such that the glass sheet slumps downwardly over the convex, partial spherical outer surface of the mold while remaining supported by the mold at the single area of contact;
    continuing said heating so that the glass sheet slumps downwardly to be supported on a plurality of spaced arms of the mold protruding from the convex, partial spherical outer surface;
    continuing said heating so that the glass sheet slumps further downwardly between the arms of the mold;
    cooling the glass sheet; and
    removing the glass sheet from the mold wherein the mold is prepared from a material facilitating removal of the glass sheet.

2. The glass slumping process recited in claim 1 wherein said supporting step includes supporting the glass sheet on a planar upper surface of the mold located at the apex of the convex, partial spherical outer surface.

3. The glass slumping process recited in claim 1 and further including, prior to said step of supporting, the step of providing the mold made from a mold compound including silica flour and plaster of Paris.

4. The glass slumping process as recited in claim 1 wherein said steps of heating and continuing said heating include heating the glass sheet in a kiln.

5. The glass slumping process recited in claim 4 wherein said steps of heating and continuing said heating include heating the kiln to a maximum temperature of 1400° Fahrenheit or less.

6. The glass slumping process as recited in claim 5 wherein said steps of heating and continuing said heating include heating the kiln at a rate of temperature increase no faster than 500° Fahrenheit per hour.

7. The glass slumping process as recited in claim 6 wherein said steps of heating and continuing said heating include maintaining the maximum temperature for 30–60 minutes.

8. The glass slumping process recited in claim 6 wherein said step of cooling includes cooling the kiln at a rate of temperature decrease no faster than 600° Fahrenheit per hour.

9. The glass slumping process recited in claim 8 and further including, prior to said removing step, the step of withdrawing the glass sheet and the mold from the kiln when the temperature of the glass sheet is 500° Fahrenheit or less.

10. The glass slumping process recited in claim 1 and further including, subsequent to said removing step, the step of mounting the glass sheet on a lamp base for use of the glass sheet as a lamp shade.

11. The glass slumping process recited in claim 10 and further including, prior to said supporting step, the step of forming a hole in the center of the glass sheet for accommodating a lamp harp of the lamp base.

12. A glass slumping process for shaping a glass sheet for use as a lamp shade comprising the steps of
    supporting a circular glass sheet of uniform thickness upon a convex, partial spherical outer surface of a mold at a single, minimum area of contact of the glass sheet with the mold, the single area of contact being disposed inwardly of a perimeter of the glass sheet;
    heating the glass sheet at a rate of temperature increase of 100° to 110° Fahrenheit per hour until a maximum temperature in the range of 1125° to 1175° Fahrenheit is reached;
    slumping the glass sheet downwardly over convex, partial spherical outer surface of the mold in response to said heating;
    cooling the glass sheet at a rate of temperature decrease of 100° to 200° Fahrenheit per hour;
    removing the glass sheet from the mold wherein the mold is prepared from a material facilitating removal of the glass sheet; and
    mounting the glass sheet on a lamp base for use as a lamp shade.

13. The glass slumping process recited in claim 12 wherein said step of supporting includes supporting a center of the glass sheet on an apex of the convex, partial spherical outer surface.

14. The glass slumping process recited in claim 12 wherein said step of slumping includes slumping the glass sheet a greater amount between arms of the mold protruding from the convex, partial spherical outer surface.

15. A glass slumping process for shaping a glass sheet for use as a lamp shade comprising the steps of supporting a glass sheet upon a convex mold at a single, minimum area of contact of the glass sheet with the mold, the single area of contact being disposed inwardly of a perimeter of the glass sheet;

heating the glass sheet at a rate of temperature increase of 100° to 110° Fahrenheit per hour until a maximum temperature in the range of 1125° to 1175° Fahrenheit is reached;

slumping the glass sheet downwardly over a convex outer surface of the mold in response to said heating, said step of slumping including initially slumping first opposing ends of the glass sheet over the mold a maximum amount while slumping second opposing ends of the glass sheet, transverse to the first ends, over the mold a minimum amount and thereafter slumping the second ends over the mold a maximum amount while slumping the first ends over the mold a minimum amount such that the first and second ends undergo substantially equal total slumping;

cooling the glass sheet at a rate of temperature decrease of 100° to 200° Fahrenheit per hour;

removing the glass sheet from the mold; and mounting the glass sheet on a lamp base for use as a lamp shade.

16. A glass slumping process for shaping a sheet of art glass comprising the steps of supporting a sheet of art glass having a thickness of ¼ inch or less upon a convex mold at a single, minimum area of contact of the glass sheet with the mold, the single area of contact being disposed inwardly of a perimeter of the glass sheet;

heating the glass sheet and the mold in a kiln to soften the glass sheet;

slumping the glass sheet downwardly over the mold a greater amount in a first direction than a second direction, transverse to the first direction, in response to said heating;

continuing said heating;

slumping the glass sheet downwardly over the mold a greater amount in the second direction than the first direction in response to said continuing said heating such that the glass sheet slumps downwardly over the mold substantially the same overall amount in the first and second directions;

cooling the glass sheet and the mold; and removing the glass sheet from the mold.

17. The glass slumping process recited in claim 16 wherein said step of supporting includes supporting a sheet of art glass upon the convex mold.

18. The glass slumping process recited in claim 16 and further including, prior to said supporting step, the step of cutting the sheet of art glass to have a circular perimeter.

19. The glass slumping process recited in claim 18 wherein said step of cutting includes cutting the sheet of art glass to be 14 inches in diameter or greater.

20. The glass slumping process recited in claim 19 wherein the single area of contact is approximately ½ to 1 inch in diameter.

* * * * *